(12) United States Patent
Lee et al.

(10) Patent No.: US 8,294,857 B2
(45) Date of Patent: Oct. 23, 2012

(54) IN-PLANE SWITCHING MODE TRANSFLECTIVE LIQUID CRYSTAL DISPLAY DEVICE AND METHOD OF FABRICATING THE SAME

(75) Inventors: Won-Ho Lee, Paju-si (KR); Jong-Won Moon, Annyang-si (KR); Ki-Bok Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 265 days.

(21) Appl. No.: 12/847,978

(22) Filed: Jul. 30, 2010

(65) Prior Publication Data
US 2011/0032460 A1 Feb. 10, 2011

(30) Foreign Application Priority Data
Aug. 5, 2009 (KR) .......................... 10-2009-0072182

(51) Int. Cl.
G02F 1/1335 (2006.01)
G02F 1/1343 (2006.01)
(52) U.S. Cl. ........................................ 349/114; 349/141
(58) Field of Classification Search ................. 349/114, 349/141
See application file for complete search history.

(56) References Cited

U.S. PATENT DOCUMENTS
2007/0146591 A1* 6/2007 Kimura et al. ................ 349/114
2008/0013023 A1* 1/2008 Ochiai et al. .................. 349/114
* cited by examiner Primary Examiner — Mark Robinson
Assistant Examiner — Charles Chang
(74) Attorney, Agent, or Firm — Birch, Stewart, Kolasch & Birch, LLP

(57) ABSTRACT

An in-plane switching mode transflective liquid crystal display device includes: first and second substrates; a gate line and a data line on an inner surface of the first substrate, the gate line and the data line crossing each other to define a pixel region; a common line parallel to the gate line; a thin film transistor connected to the gate and data lines; a first passivation layer over the thin film transistor; a reflecting layer over the first passivation layer; a second passivation layer over the reflecting layer; a pixel electrode over the second passivation layer; a third passivation layer over the pixel electrode; a common electrode over the third passivation layer, the common electrode connected to the common line, the common electrode including a plurality of first openings along a first direction in the transmissive area and a plurality of second openings along a second direction different from the first direction in the reflective area; a color filter layer on an inner surface of the second substrate; and a liquid crystal layer between the first and second substrate.

19 Claims, 8 Drawing Sheets

US 8,294,857 B2

IN-PLANE SWITCHING MODE TRANSFLECTIVE LIQUID CRYSTAL DISPLAY DEVICE AND METHOD OF FABRICATING THE SAME

This application claims the benefit of Korean Patent Application No. 10-2009-0072182, filed on Aug. 5, 2009, which is hereby incorporated by reference in its entirety.

BACKGROUND OF THE INVENTION

1. Field of the Invention

The present invention relates to an in-plane switching (IPS) mode liquid crystal display (LCD) device, and more particularly, to an IPS mode transflective LCD device where reflective efficiency and contrast ratio are improved and a method of fabricating the IPS mode transflective LCD device.

2. Discussion of the Related Art

In general, the LCD device uses the optical anisotropy and polarization properties of liquid crystal molecules to produce an image. Since the LCD device is driven by a lower power as compared with the cathode ray tube (CRT) and has advantages of a small size and a thin profile, the LCD device has been widely used as a flat panel display (FPD) device for a monitor or a television. In addition, since the LCD device has a portability due to a light weight, the LCD device has been widely used as a display device for a notebook computer or a personal portable terminal.

The LCD device includes two substrates facing each other and a liquid crystal layer between the two substrates. Two electrodes are formed on inner surfaces of the two substrates and an electric field is generated by a voltage difference between the two electrodes. Liquid crystal molecules of the liquid crystal layer are re-aligned by the electric field and transmittance of the liquid crystal layer is adjusted. As a result, the LCD device displays an image.

Since the LCD device has a non-emissive type, a light source is required to the LCD device. Accordingly, the LCD device includes a liquid crystal panel having two substrates and a liquid crystal layer between the two substrates and a backlight unit under the liquid crystal panel. The light from the backlight unit is supplied to the liquid crystal panel and the liquid crystal layer adjusts the light according to re-alignment of the liquid crystal molecules, thereby the image displayed.

Since a transmissive LCD device, where a light from the backlight unit passes through the liquid crystal panel, uses an artificial light source such as the backlight unit, the transmissive LCD device displays a bright image under a dark circumstance. However, since the backlight unit consumes a power, the transmissive LCD device has a disadvantage of a relatively large power consumption.

To improve the disadvantage of the transmissive LCD device, a reflective LCD device using an ambient light has been suggested. Since the reflective LCD device uses an ambient natural light or an ambient artificial light, the reflective LCD device has a relatively lower power consumption as compared with the transmissive LCD device. As a result, the reflective LCD device is widely used as a display device for a portable terminal such as a personal digital assistant (PDA). Although the reflective LCD device without an additional light source has an advantage in power consumption, the reflective LCD device cannot be used with a week ambient light or without an ambient light.

Recently, a transflective LCD device having advantages of the transmissive LCD device and the reflective LCD device has been suggested. The transflective LCD device may have one of an electrically controlled birefringence (ECB) mode and a vertical alignment (VA) mode. However, the ECB mode transflective LCD device has a disadvantage of a narrow viewing angle, and the VA mode transflective LCD device has a disadvantage of a high production cost for a plurality of compensation films.

The LCD device is not applied only to a personal display device such as a notebook computer but also to a used for a mass media display device such as a television. As a result, a plurality of users watch the LCD device along various angles and the viewing angle of the LCD device has been the subject of recent research. Accordingly, to improve the disadvantages of a narrow viewing angle of the ECB mode transflective LCD device and the VA mode transflective LCD device, an in-plane switching (IPS) mode transflective LCD device where a pixel electrode and a common electrode are formed on the same substrate and the liquid crystal molecules are re-aligned by a horizontal electric field has been suggested.

FIG. 1 is a cross-sectional view showing an in-plane switching mode transflective liquid crystal display device according to the related art. In FIG. 1, an in-plane switching (IPS) mode transflective liquid crystal display (LCD) device 1 includes first and second substrates 2 and 83 and a liquid crystal layer 90 between the first and second substrates 2 and 83. The first and second substrates 2 and 83 face and are spaced apart from each other. Although not shown in FIG. 1, a gate line and a data line are formed on an inner surface of the first substrate 2. The gate line crosses the data line to define a pixel region P having a transmissive area TA and a reflective area RA. In addition, although not shown in FIG. 1, a common line parallel to the gate line crosses the pixel region P and a switching thin film transistor (TFT) is disposed in the pixel region P. A reflecting layer 50 of a metallic material having a relatively high reflectance is formed in the reflective area RA, and a pixel electrode 70 is formed over the reflecting layer 50. The pixel electrode 70 is formed in the reflective area RA and the transmissive area TA. An insulating layer 72 is formed on the pixel electrode 70 and a common electrode 80 connected to the common line is formed on the insulating layer 72. The common electrode 80 includes a plurality of first openings op1 and a plurality of second openings op2 each having a bar shape. The plurality of first openings op1 and the plurality of second openings op2 are disposed in the transmissive and reflective areas TA and RA, respectively.

A black matrix (not shown) is formed on an inner surface of the second substrate 83 and a color filter layer 86 is formed on the black matrix. The black matrix corresponds to a border between the adjacent pixel regions P and the color filter layer 86 corresponds to the pixel region P. In addition, an overcoat layer 88 is formed on the color filter layer 86. First and second polarizing plates 93 and 95 are formed on outer surfaces of the first and second substrates 2 and 83, respectively.

The IPS mode transflective LCD device 1 has first and second cell gaps d1 and d2 in the transmissive and reflective areas TA and RA, respectively. The first cell gap d1 which corresponds to a thickness of the liquid crystal layer 90 in the transmissive area TA is twice of the second cell gap d2 which corresponds to a thickness of the liquid crystal layer 90 in the reflective area RA so that retardation of light passing through the liquid crystal layer 90 in the transmissive area TA can be the same as retardation of light passing through the liquid crystal layer 90 in the reflective area RA. The light from a backlight unit (not shown) under the first substrate 2 passes through the liquid crystal layer 90 in the transmissive area TA, while the ambient light passes through the liquid crystal layer 90, the ambient light is reflected at the reflecting layer 50 and the reflected ambient light passes through the liquid crystal layer 90 again in the reflective area RA. As a result, the light passes through the liquid crystal layer 90 once in the transmissive area TA, while the light passes through the liquid crystal layer 90 twice in the reflective area RA.

Since the retardation of light is proportional to a distance of light path, the retardation of light in the transmissive area TA is different from the retardation of light in the reflective area RA when the first cell gap d1 is the same as the second cell gap d2. To make the retardations in the transmissive and reflective areas TA and RA the same as each other, the liquid crystal layer 90 is formed such that the first cell gap d1 is twice the second cell gap d2 (d1=2×d2). For example, the liquid crystal layer 90 in the transmissive area TA may be formed as a λ/2 cell where the phase of light changes by π, while the liquid crystal layer 90 in the reflective area RA may be formed as a λ/4 cell where the phase of light changes by π/2.

In the transmissive area TA of the IPS mode transflective LCD device 1, a black image is obtained when a director, which is a longer axis of a liquid crystal molecule, of the liquid crystal layer 90 of the λ/2 cell is parallel to a polarization axis of the second polarizing plate 95. In the reflective area RA of the IPS mode transflective LCD device 1, the black image is obtained when the director of the liquid crystal layer 90 of the λ/4 cell has an angle of 45° with respect to the polarization axis of the second polarizing plate 95. Since the orientation directions for each of the first and second substrates 2 and 83 in the transmissive and reflective areas TA and RA are different from each other, the split orientation for the transmissive and reflective areas TA and RA may be performed only through an ultraviolet (UV) orientation method.

However, the IPS mode transflective LCD device 1 has disadvantages of a low reflection efficiency and an increase of a black image brightness in the reflective area RA where the liquid crystal layer 90 has the lower thickness.

FIG. 2 is a graph showing a relation between a reflectance and a voltage difference according to a cell gap in an in-plane switching mode transflective liquid crystal display device according to the related art, FIG. 3 is a graph showing a relation between a reflectance and a voltage difference according to a wavelength in an in-plane switching mode transflective liquid crystal display device according to the related art, and FIG. 4 is a graph showing a relation between a reflectance of a black image and a wavelength in an in-plane switching mode transflective liquid crystal display device according to the related art.

In FIG. 2, as the cell gap decreases, the reflectance in the reflective area decreases when the voltage difference between the pixel electrode and the common electrode is within a range of about 2V to about 7V. For example, when the voltage difference of about 5V is applied to the liquid crystal layer in the reflective area, the reflectance through the liquid crystal layer having the cell gap of about 1.8 μm is about 0.74 and the reflectance through the liquid crystal layer having the cell gap of about 4.3 μm is about 0.85. As a result, the reflectance through the liquid crystal layer having the cell gap of about 1.8 μm is reduced by about 15% of the reflectance through the liquid crystal layer having the cell gap of about 4.3 μm.

Moreover, the brightness of a white image decreases as the cell gap decreases. The white image may be obtained in the reflective area when the voltage difference between the pixel electrode and the common electrode is within a range of about 6V to about 7V. As the cell gap decreases, the uniformity of the directors according to positions is deteriorated. In addition, when the liquid crystal layer is driven by the voltage difference, as the director is re-aligned to be more parallel to the polarization axis of the second polarizing plate, the change in brightness of the white image due to the change of the director increases.

In FIG. 3, the brightness of each of the black images for wavelengths of about 650 nm and about 450 nm is greater than the brightness of the black image for a wavelength of about 550 nm. The black images for the wavelengths of about 650 nm, about 550 nm and about 450 nm may be obtained in the reflective area when the voltage difference between the pixel electrode and the common electrode is about 0V. For example, when the voltage difference of about 0V is applied to the liquid crystal layer in the reflective area, the reflectance for the green-colored light having the wavelength of about 550 nm may be about 0 and the black image for the green-colored light may have a relatively low brightness. However, when the voltage difference of about 0V is applied to the liquid crystal layer in the reflective area, the reflectance of the blue-colored light having the wavelength of about 450 nm may be about 0.23 and the black image for the blue-colored light may have a relatively high brightness.

In FIG. 4, when the voltage difference of about 0V is applied to the liquid crystal layer, the reflectance in the reflective area has a minimum value at the wavelength of about 550 nm and the reflectance in the reflective area increases as the wavelength increases or decreases. For example, the reflectance in the reflective area may be about 0 at the wavelength of about 550 nm, and the reflectance in the reflective area may be greater than about 0 at the other wavelengths. The increase in the brightness of the black image may cause deterioration of contrast ratio of the IPS mode transflective LCD device.

SUMMARY OF THE INVENTION

Accordingly, the present invention is directed to an in-plane switching mode transflective liquid crystal display device and a method of fabricating the same that substantially obviate one or more of the problems due to limitations and disadvantages of the related art.

An advantage of the present invention is to provide an in-plane switching mode transflective liquid crystal display device where a reflection efficiency and a brightness of a black image are improved due to increasing a cell gap in a reflective area.

Another advantage of the present invention is to provide a method of fabricating n in-plane switching mode transflective liquid crystal display device where a degree of freedom in fabrication and a productivity are improved due to a twist orientation in a reflective area and an optimization in a twist angle of liquid crystal molecules.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode transflective liquid crystal display device includes: first and second substrates facing and spaced apart from each other; a gate line and a data line on an inner surface of the first substrate, the gate line and the data line crossing each other to define a pixel region having a transmissive area and a reflective area; a common line parallel to the gate line; a thin film transistor connected to the gate line and the data line; a first passivation layer over the thin film transistor; a reflecting layer over the first passivation layer in the reflective area; a second passivation layer over the reflecting layer; a pixel electrode over the second passivation layer, the pixel electrode having a plate shape in the pixel region and connected to the thin film transistor; a third passivation layer over the pixel electrode; a common electrode over the third passivation layer, the common electrode connected to the common line, the common electrode including a plurality of first openings along a first direction in the transmissive area and a plurality of second openings along a second direction different from the first direction in the reflective area, each of the plurality of first openings and the plurality of second openings having a bar shape; a color filter layer on an inner surface of the second substrate; and a liquid crystal layer between the first and second substrate.

In another aspect, a method of fabricating an in-plane switching mode transflective liquid crystal display device includes: forming a gate line and a data line on an inner surface of a first substrate, the gate line and the data line crossing each other to define a pixel region having a transmissive area and a reflective area; forming a common line parallel to the gate line; forming a thin film transistor connected to the gate line and the data line; forming a first passivation layer over the thin film transistor; forming a reflecting layer over the first passivation layer in the reflective area; forming a second passivation layer over the reflecting layer; forming a pixel electrode over the second passivation layer, the pixel electrode having a plate shape in the pixel region and connected to the thin film transistor; forming a third passivation layer over the pixel electrode; forming a common electrode over the third passivation layer, the common electrode connected to the common line, the common electrode including a plurality of first openings along a first direction in the transmissive area and a plurality of second openings along a second direction different from the first direction in the reflective area, each of the plurality of first openings and the plurality of second openings having a bar shape; forming a color filter layer on an inner surface of a second substrate; attaching the first and second substrates such that the common electrode faces the color filter layer; and forming a liquid crystal layer between the first and second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
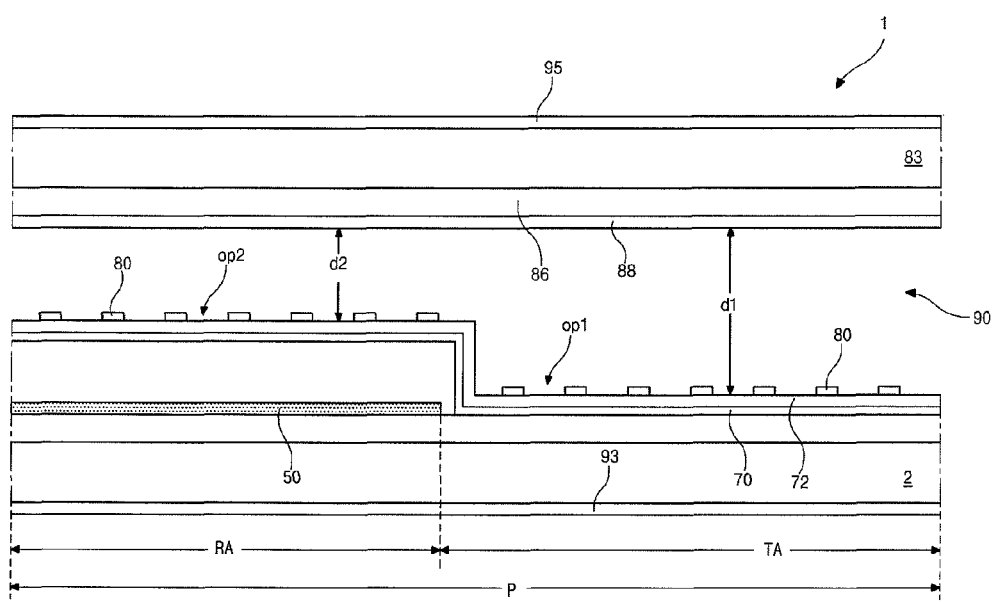
FIG. 1 is a cross-sectional view showing an in-plane switching mode transflective liquid crystal display device according to the related art.
Figure 2:
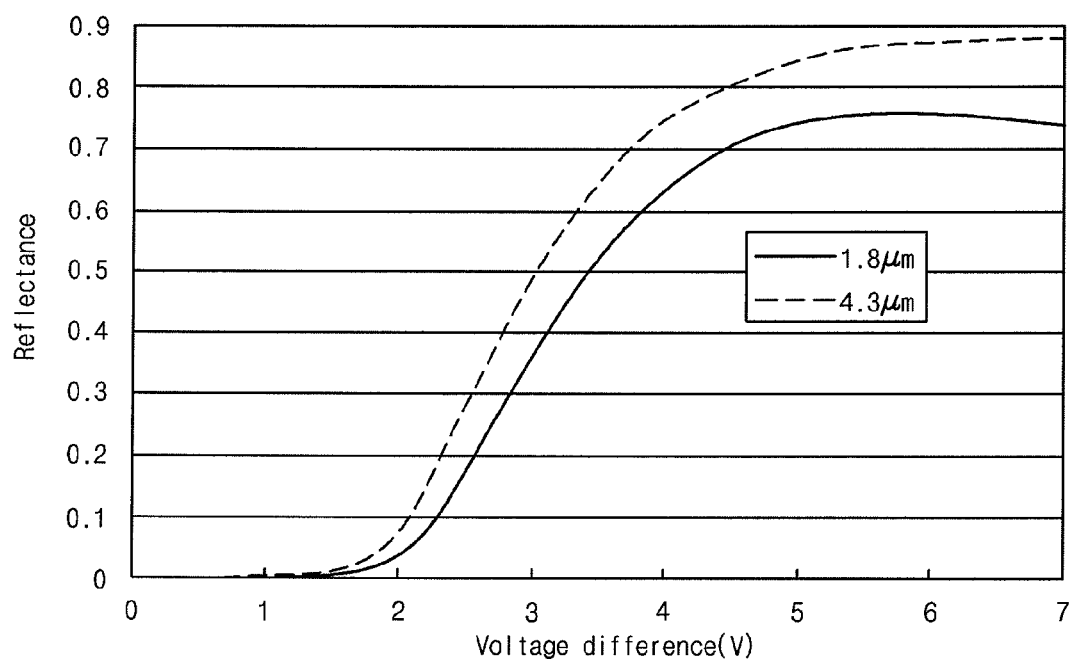
FIG. 2 is a graph showing a relation between a reflectance and a voltage difference according to a cell gap in an in-plane switching mode transflective liquid crystal display device according to the related art.
Figure 3:
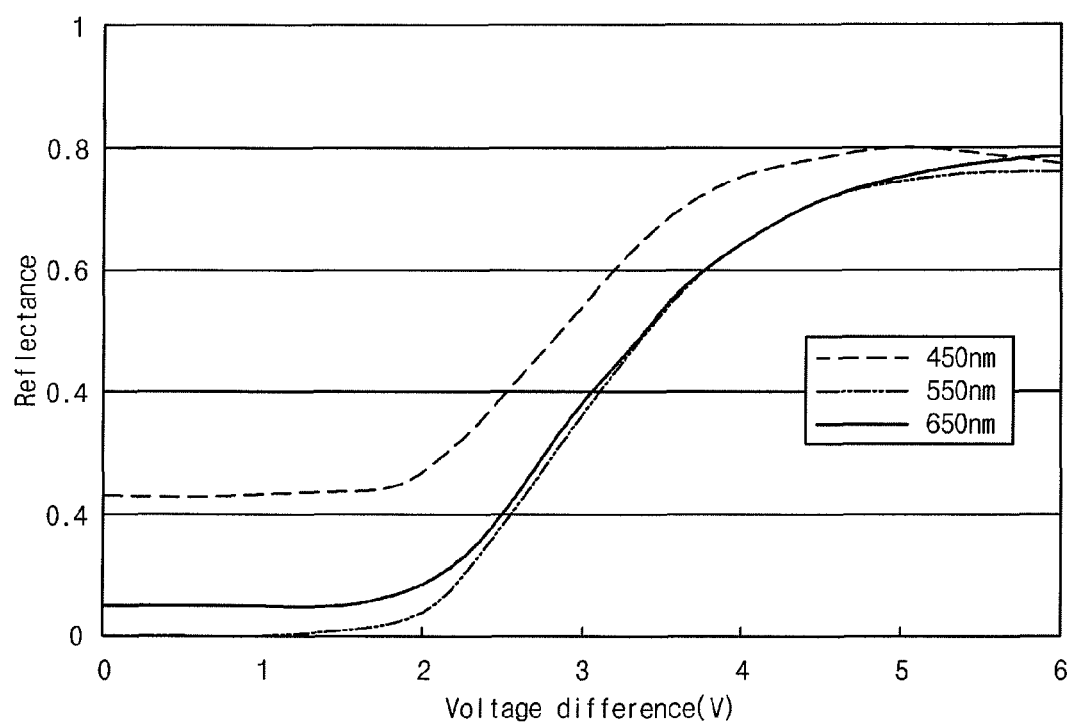
FIG. 3 is a graph showing a relation between a reflectance and a voltage difference according to a wavelength in an in-plane switching mode transflective liquid crystal display device according to the related art.
Figure 4:
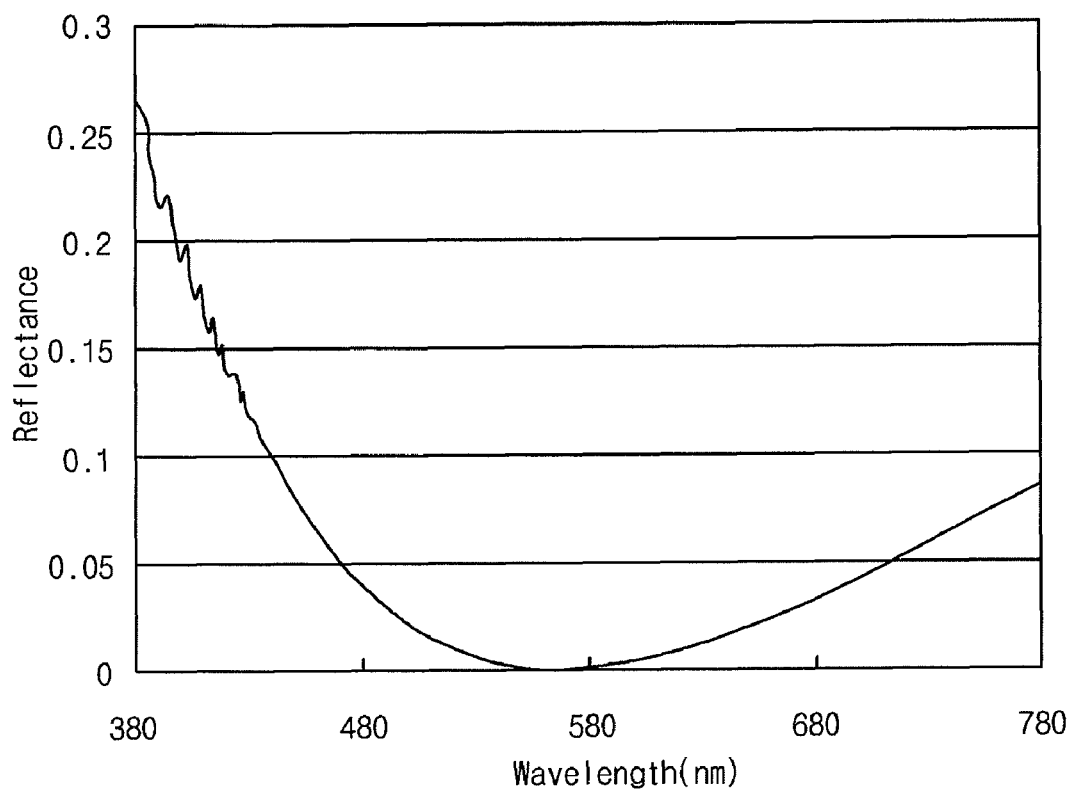
FIG. 4 is a graph showing a relation between a reflectance of a black image and a wavelength in an in-plane switching mode transflective liquid crystal display device according to the related art.
Figure 5:
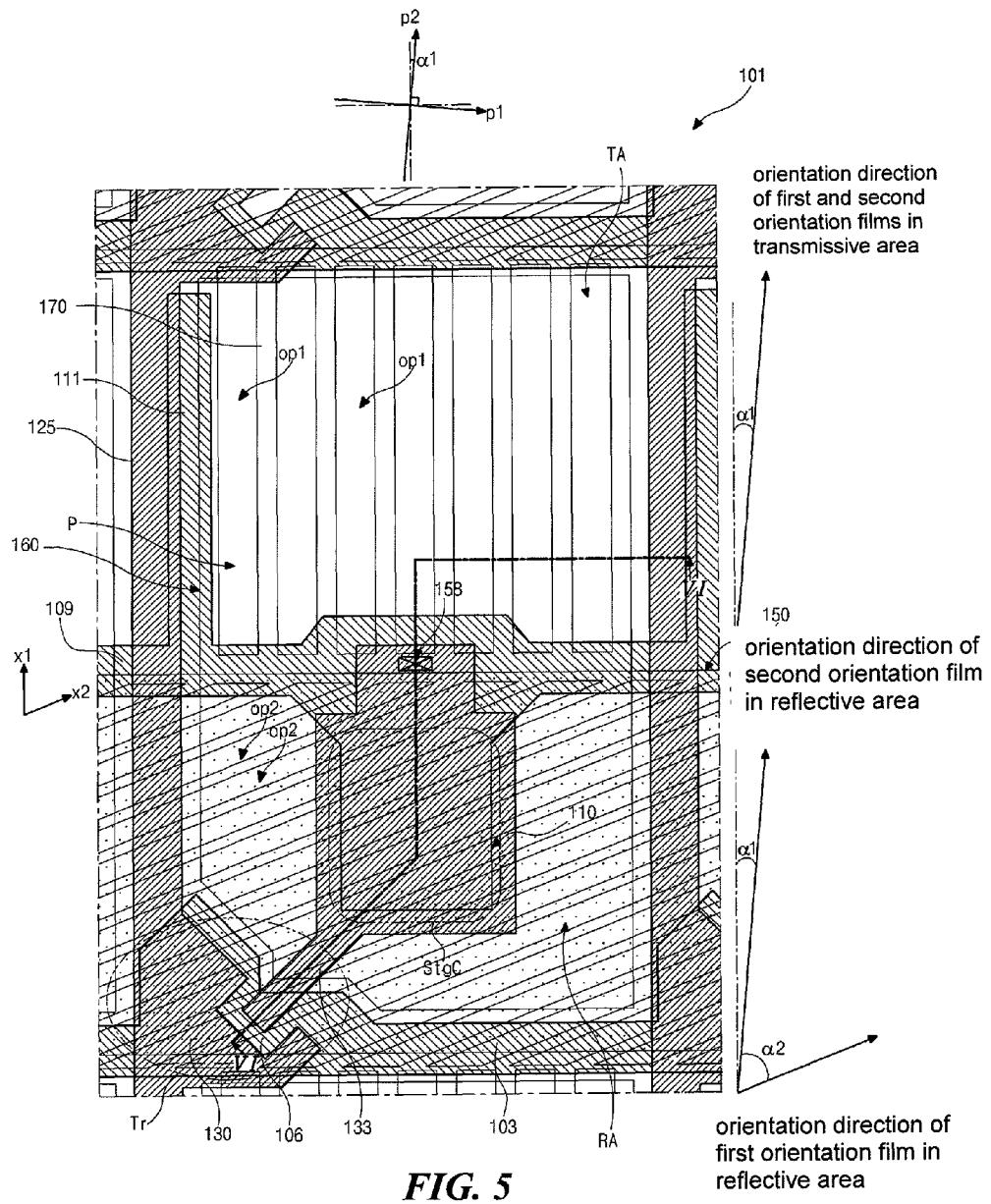
FIG. 5 is a plane view showing an in-plane switching mode transflective liquid crystal display device according to an embodiment of the present invention.
Figure 6:
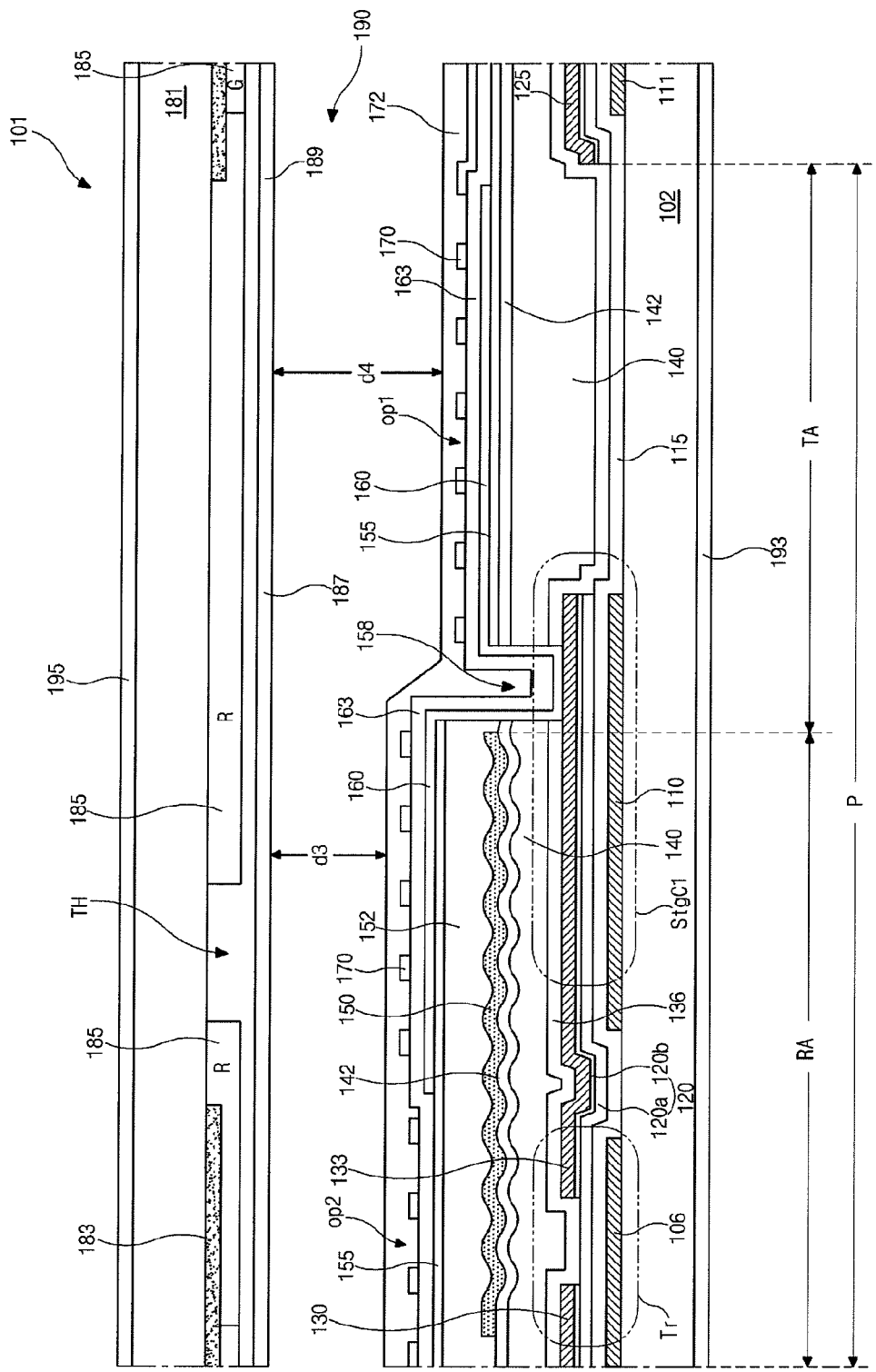
FIG. 6 is a cross-sectional view taken along a line VI-VI of FIG. 5.

FIG. 5 is a plane view showing an in-plane switching mode transflective liquid crystal display device according to an embodiment of the present invention, and FIG. 6 is a cross-sectional view taken along a line VI-VI of FIG. 5.

In FIGS. 5 and 6, an in-plane switching (IPS) mode transflective liquid crystal display (LCD) device 101 includes first and second substrates 102 and 181 facing and spaced apart from each other and a liquid crystal layer 190 between the first and second substrates 102 and 181. The first and second substrates 102 and 181 include a pixel region P having a transmissive area TA and a reflective area RA. A gate line 103, a data line 125 and a common line 109 are formed on an inner surface of the first substrate 102. The gate line 103 and the data line 125 cross each other to define the pixel region P. The common line 109 is parallel to the gate line 103 and crosses the pixel region P. A first common protrusion 110 extending from the common line 109 is formed in the reflective area RA, and a second common protrusion 111 extending from the common line 109 is formed to partially overlap the data line 125.

In addition, a thin film transistor (TFT) Tr connected to the gate line 103 and the data line 125 is formed in the pixel region P. The TFT Tr includes a gate electrode 106, a gate insulating layer 115, a semiconductor layer 120, a source electrode 130 and a drain electrode 133. The gate electrode is connected to the gate line 103 and the source electrode 130 is connected to the data line 125. The semiconductor layer 120 includes an active layer 120a of intrinsic amorphous silicon and an ohmic contact layer 120b of impurity-doped amorphous silicon. The source and drain electrodes 130 and 133 are spaced apart from each other. The drain electrode 133 overlaps the first common protrusion 110 to constitute a storage capacitor StgC using the first common protrusion 110, the gate insulating layer 115 and the drain electrode 133 as a first capacitor electrode, a dielectric layer and a second capacitor electrode, respectively.

A first passivation layer 136 of an inorganic insulating material is formed on the TFT Tr and the data line 125, and a second passivation layer 140 of an organic insulating material is formed on the first passivation layer 136. The second passivation layer 140 may include a plurality of uneven portions at a top surface thereof in the reflective area RA. A third passivation layer 142 of an inorganic insulating material is formed on the second passivation layer 140, and a reflecting layer 150 of a metallic material having a relatively high reflectance is formed on the third passivation layer 142 in the reflective area RA. Each of the third passivation layer 142 and the reflecting layer 150 may include a plurality of uneven portions at a top surface thereof due to the second passivation layer 140.

The first passivation layer 136 of an inorganic insulating material may be formed between the TFT Tr and the second passivation layer 140 to prevent contamination of a channel region of the active layer 120*a* and deterioration of the TFT Tr due to direct contact of the second passivation layer 140 of an organic insulating material and the semiconductor layer 120. In addition, the third passivation layer 142 may be formed between the second passivation layer 140 and the reflective layer 150 to improve the adhesive force between the second passivation layer 140 of an organic insulating material and the reflective layer 150 of a metallic material. Although the IPS mode transflective LCD device 101 of FIGS. 5 and 6 includes the first, second and third passivation layers 136, 140 and 142, the first and third passivation layers 136 and 142 may be omitted in another embodiment.

A fourth passivation layer 152 of an organic insulating material is formed on the reflective layer 150 in the reflective area RA. A thickness of the liquid crystal layer 190 in the reflective area RA, i.e., a third cell gap d3 is smaller than a thickness of the liquid crystal layer 190 in the transmissive area TA, i.e., a fourth cell gap d4 due to the fourth passivation layer 152. In addition, a fifth passivation layer 155 of an inorganic insulating material is formed on the third and fourth passivation layers 142 and 152. The fifth, third, second and first passivation layers 155, 142, 140 and 136 may include a drain contact hole 158 exposing the drain electrode 133.

A pixel electrode 160 of a transparent conductive material is formed on the fifth passivation layer 155 in the pixel region P. The pixel electrode 160 has a plate shape and is connected to the drain contact hole 133 through the drain contact hole 158. The fifth passivation layer 155 may be formed between the fourth passivation layer 152 and the pixel electrode 160 to improve the adhesive force between the fourth passivation layer 152 of an organic insulating material and the pixel electrode 160 of a transparent conductive material, and may be omitted in another embodiment. In addition, the pixel electrode 160 may partially overlap the second common protrusion 111 and the second common protrusion 111 may shield a light passing through a gap between the data line 125 and the pixel electrode 160 to prevent light leakage.

A sixth passivation layer 163 of an inorganic insulating material is formed on the pixel electrode 160, and a common electrode 170 of a transparent conductive material is formed on the sixth passivation layer 163 in each pixel region P or in an entire display region of the first substrate 102. Although not shown in FIGS. 5 and 6, the common electrode 107 is connected to the common line 109 through a common contact hole. Further, a first orientation film 172 is formed on the common electrode 170.

The common electrode 170 includes a plurality of first openings op1 each having a bar shape and a plurality of second openings op2 each having a bar shape. The plurality of first openings op1 spaced apart from each other are disposed along a first direction X1 parallel to the data line 125 in the transmissive area TA, and the plurality of second openings op2 spaced apart from each other are disposed along a second direction X2 different from the first direction X1 in the reflective area RA.

In addition, a black matrix 183 is formed on an inner surface of the second substrate 181, and a color filter layer 185 is formed on the black matrix 183. The black matrix 183 corresponds to a boundary portion of the pixel region P, i.e., the gate line 103 and the data line 125. The color filter layer 185 includes red, green and blue color filters R, G and B each corresponding to the pixel region P. Each color filter may have a through hole TH at a central portion of the reflective area RA so that a brightness in the reflective area RA can be improved. An overcoat layer 187 is formed on the color filter layer 185, and a second orientation film 189 is formed on the overcoat layer 187.

Moreover, first and second polarizing plates 193 and 195 are formed on outer surfaces of the first and second substrates 102 and 181, respectively. The liquid crystal layer 190 between the first and second orientation films 172 and 189 has a thickness corresponding to the third cell gap d3 in the reflective area RA and a thickness corresponding to the fourth cell gap d4 greater than the third cell gap d3 in the transmissive area TA. For example, the fourth cell gap d4 may be 1.7 times of the third cell gap d3 (d4=1.7×d3).

The relation of orientation direction, polarization axis and direction of openings in the IPS mode transflective LCD device according to the present invention will be illustrated hereinafter.

Figure 7:
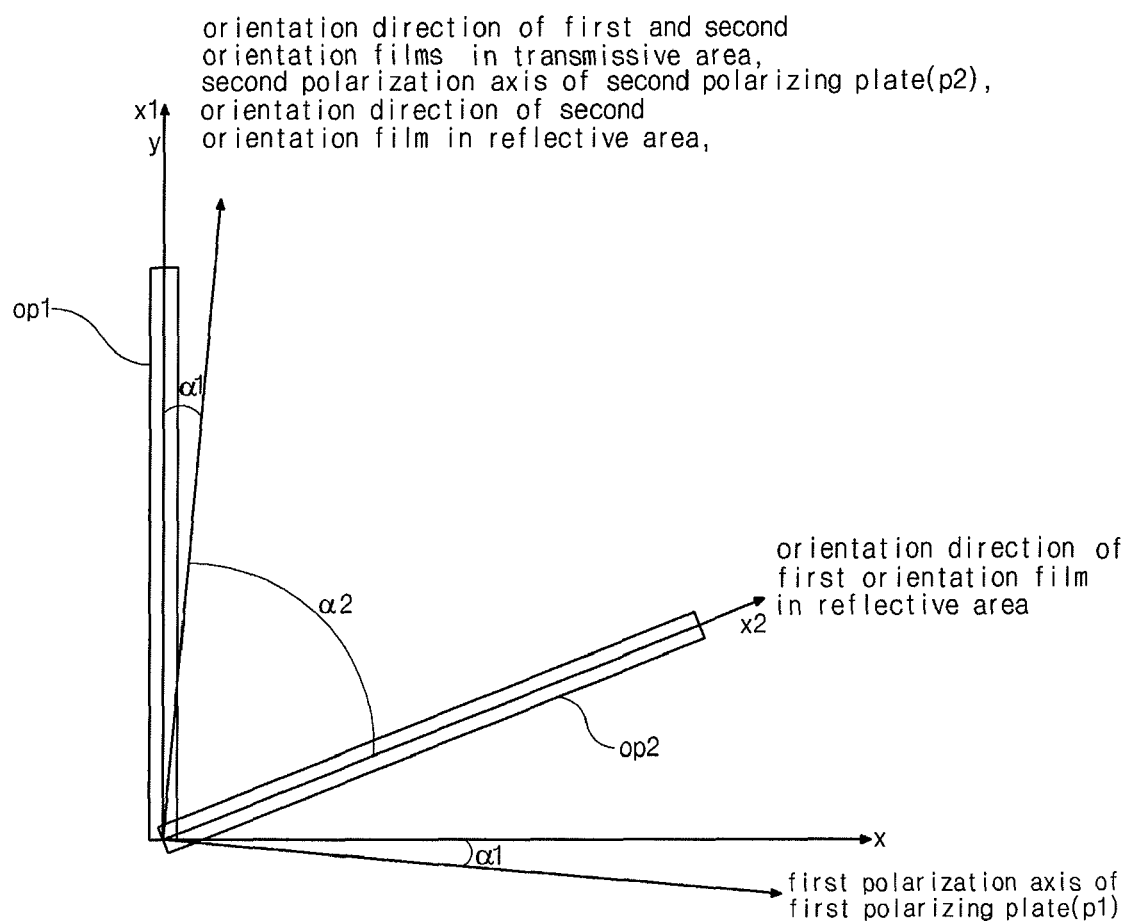
FIG. 7 is a coordinate system showing orientation directions, polarization axes and directions of openings in an in-plane switching mode transflective liquid crystal display device according to an embodiment of the present invention.

FIG. 7 is a coordinate system showing orientation directions, polarization axes and directions of openings in an in-plane switching mode transflective liquid crystal display device according to an embodiment of the present invention.

In FIGS. 5, 6 and 7, an x-axis of the coordinate system is defined as a direction parallel to the gate line 125 and a y-axis of the coordinate system is defined as a direction parallel to each first opening op1 in a transmissive area TA, i.e., the first direction X1. An orientation direction of the second orientation film 189 in the transmissive area TA is the same as an orientation direction of the second orientation film 189 in the reflective area RA. Accordingly, the second orientation film 189 of the second substrate 181 has the single orientation direction regardless of the transmissive and reflective areas TA and RA, and the second orientation film 189 may be oriented through a single step for orientation using an ultraviolet (UV) orientation method along a single direction or a rubbing method instead of a split orientation step. The split orientation step may be performed only through the UV orientation method. The process time for the UV orientation method is longer than the process time for the rubbing method, and the rubbing method is superior to the UV orientation method in a display quality of an image sticking. Accordingly, the process time and the property are improved through the single step for orientation of the second orientation film 189 using a rubbing method.

The first and second polarizing plates 193 and 195 have first and second polarization axes p1 and p2, respectively, and the first polarization axis p1 is perpendicular to the second polarization axis p2. The second polarization axis p2 is parallel to each of the orientation direction of the first and second orientation films 172 and 189 in the transmissive area TA and the orientation direction of the second orientation film 189 in the reflective area RA. Accordingly, each of the orientation direction of the first and second orientation films 172 and 189 in the transmissive area TA, the second polarization axis p2 and the orientation direction of the second orientation film 189 in the reflective area RA has a first angle α1 clockwise with respect to the y-axis of the direction parallel to each first opening op1, i.e., the first direction X1. In addition, the first polarization axis p1 has the first angle α1 clockwise with respect to the x-axis. For example, the first angle α1 may be within a range of about 5° to about 10°.

Further, the orientation direction of the first orientation film 172 in the reflective area RA is parallel to the direction of each second opening op2, i.e., the second direction X2. Each of the orientation direction of the first orientation film 172 in the reflective area RA and the direction of each second opening op2, i.e., the second direction X2 has a second angle α2 clockwise with respect to the orientation direction of the second orientation film in the transmissive and reflective areas TA and RA. For example, the second angle α2 may be within a range of about 62° to about 64°.

When the first and second angles α1 and α2 are about 5° and about 63°, respectively, each of the orientation direction of the first and second orientation films 172 and 189 in the transmissive area TA, the second polarization axis p2 of the second polarizing plate 195 and the orientation direction of the second orientation film 189 in the reflective area RA may have an angle of about 5° clockwise with respect to the direction of each first opening op1, i.e., the first direction X1. In addition, each of the orientation direction of the first orientation film 172 in the reflective area RA and the direction of each second opening op2, i.e., the second direction X2 may have an angle of about 68° that is the sum of first and second angles α1 and α2 clockwise with respect to the direction of each first opening op1, i.e., the first direction X1.

In the IPS mode transflective LCD device 101 according to the present invention, since the liquid crystal layer 190 in the reflective area RA has a twist structure such that the orientation directions of the first and second orientation films 172 and 189 are twisted by the second angle α2 with respect to each other, the reflective area RA corresponding to the third cell gap d3 that is about 1/1.7 times of the fourth cell gap d4 (d3=(1/1.7)×d4) has the same retardation as the transmissive area TA corresponding to the fourth cell gap d4. For example, the thickness of the liquid crystal layer 190 in the transmissive area TA, i.e., the fourth cell gap d4 may be within a range of about 3.8 μm to about 4.3 μm, and the thickness of the liquid crystal layer 190 in the reflective area RA, i.e., the third cell gap d3 may be within a range of about 2.24 μm to about 2.53 μm. As a result, the reflection efficiency and the brightness of a black image are improved due to increase of the cell gap in the reflective area RA.

In addition, since the orientation direction of the second orientation film 189 in the transmissive area TA is the same as the orientation direction of the second orientation film 189 in the reflective area RA, the step for orientation of the second orientation film 189 may be performed through one of a rubbing method and a UV orientation method along a single direction. As a result, the degree of freedom in fabrication and the productivity are improved.

Figure 8:
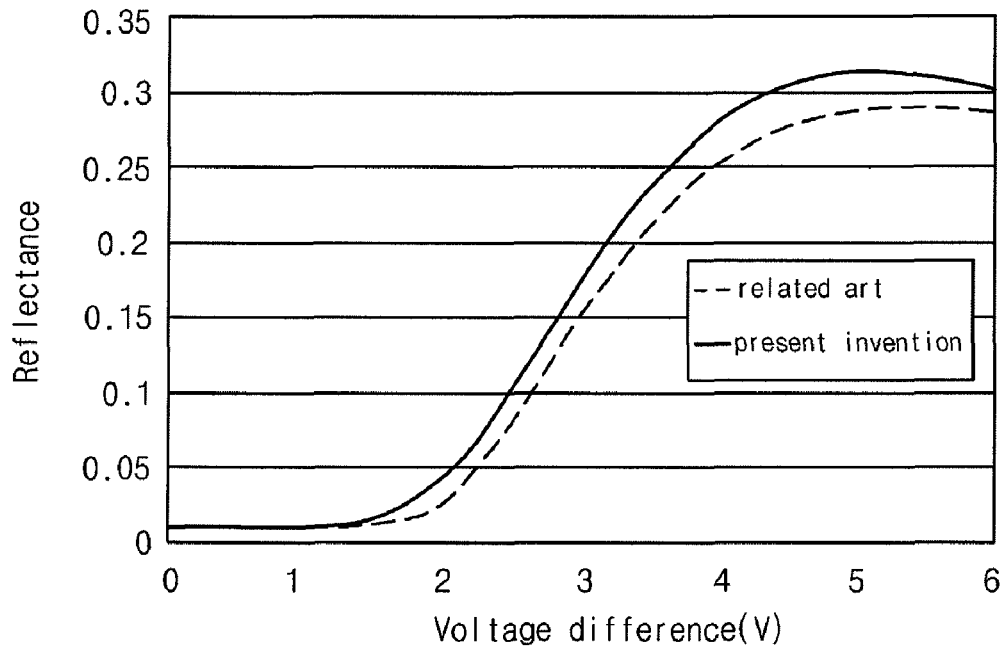
FIG. 8 is a graph showing a relation between a reflectance and a voltage difference in in-plane switching mode transflective liquid crystal display devices according to an embodiment of the present invention and the related art.

FIG. 8 is a graph showing a relation between a reflectance and a voltage difference in in-plane switching mode transflective liquid crystal display devices according to an embodiment of the present invention and the related art. The reflectance of FIG. 8 means a total reflectance of the in-plane switching (IPS) mode transflective liquid crystal display (LCD) device including a color filter layer and a polarizing plate.

In FIG. 8, the reflectance in the reflective area of the IPS mode transflective LCD device of the present invention is improved by about 10% as compared with the reflectance in the reflective area of the IPS mode transflective LCD device of the related art. For example, when the voltage difference of about 5V is applied to the liquid crystal layer in the reflective area, the reflectance of the IPS mode transflective LCD device of the present invention is about 0.315 and the reflectance of the IPS mode transflective LCD device of the related art is about 0.285. Accordingly, the reflectance may be improved by about 10.5%.

TABLE 1 is a table illustrating a brightness of a black image, a brightness of a white image and a contrast ratio in a reflective area of in-plane switching mode transflective liquid crystal display devices according to an embodiment of the present invention and the related art. In TABLE 1, the brightness of the reflective area means the reflectance of the reflective area.

TABLE 1

|  | related art | present invention |
| --- | --- | --- |
| brightness of black image | 0.010285 | 0.008588 |
| brightness of white image | 0.276749 | 0.302808 |
| contrast ratio | 27 | 35 |

In TABLE 1, the brightness of each of black and white images in the reflective area means the reflectance of the reflective area. The brightness of the black image of the IPS mode transflective LCD device of the related art is about 0.010285, while the brightness of the black image of the IPS mode transflective LCD device of the present invention is about 0.008588. As a result, the brightness of the black image is improved by about 16%. In addition, the brightness of the white image of the IPS mode transflective LCD device of the related art is about 0.276749, while the brightness of the white image of the IPS mode transflective LCD device of the present invention is about 0.302808. As a result, the brightness of the white image is improved by about 10%. The contrast ratio is defined by the ratio of the brightness of the white image to the brightness of the black image. Accordingly, the contrast ratio of the IPS mode transflective LCD device of the related art is about 27 and the contrast ratio the IPS mode transflective LCD device of the present invention is about 35. As a result, the contrast ratio is improved by about 30%.

Figure 9:
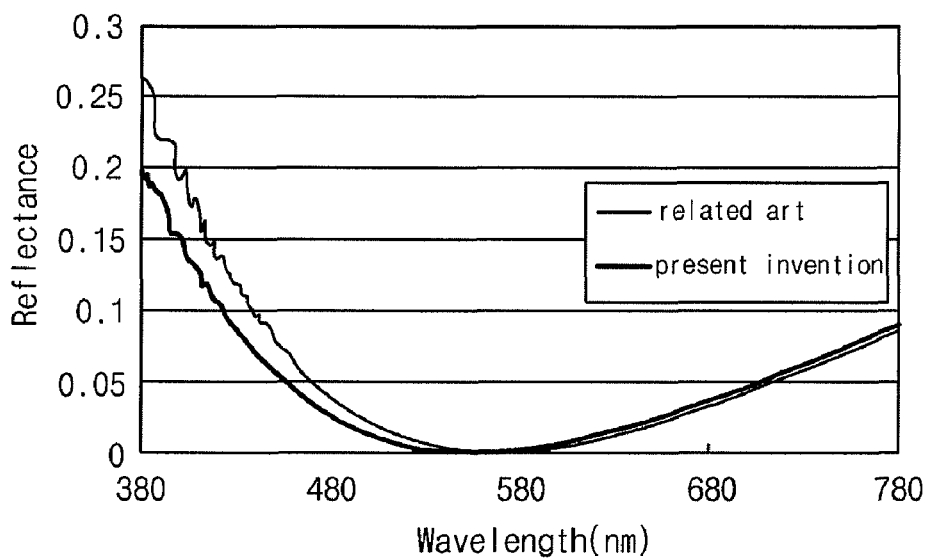
FIG. 9 is a graph showing a relation between a reflectance of a black image and a wavelength in in-plane switching mode transflective liquid crystal display devices according to an embodiment of the present invention and the related art.

FIG. 9 is a graph showing a relation between a reflectance of a black image and a wavelength in in-plane switching mode transflective liquid crystal display devices according to an embodiment of the present invention and the related art. The reflectance of FIG. 9 means a total reflectance of the in-plane switching (IPS) mode transflective liquid crystal display (LCD) device including a color filter layer and a polarizing plate when the voltage difference of about 0V is applied to the liquid crystal layer.

In FIG. 9, the reflectance in the reflective area of the IPS mode transflective LCD device of the present invention is improved as compared with the reflectance in the reflective area of the IPS mode transflective LCD device of the related art. Although the reflectance of the IPS mode transflective LCD device of the present invention is similar to the reflectance of the IPS mode transflective LCD device of the related art for a wavelength within a range of about 550 nm to about 780 nm, the reflectance of the IPS mode transflective LCD device of the present invention is reduced as compared with the reflectance of the IPS mode transflective LCD device of the related art for a wavelength within a range of about 380 nm to about 550 nm. For example, the reflectance of the IPS mode transflective LCD device of the present invention for the wavelength of about 450 nm corresponding to a blue-colored light is about 0.065, while the reflectance of the IPS mode transflective LCD device of the related art for the wavelength of about 450 nm is about 0.085. Since the reflectance for the wavelength of about 450 nm may be improved by about 24%, the black image may be displayed with a reduced brightness and the contrast ratio may be improved.

In an in-plane switching mode transflective liquid crystal display device according to an embodiment of the present invention, consequently, since a cell gap of a reflective area increases without increase of a cell gap of a transmissive area, a reflectance (i.e., a brightness) of a white image in the reflective area increases and a reflectance (i.e., a brightness) of a black image in the reflective area for a lower wavelength decreases. Accordingly, a contrast ratio of the IPS mode transflective LCD device is improved.

In addition, since a second orientation film of the transmissive area has the same orientation direction as the second orientation film of the reflective area, the step for orientation of the second orientation film is performed through one of a rubbing method and a UV orientation method along a single direction. As a result, a degree of freedom in fabrication is improved. Further, a productivity is improved due to the step for orientation of the second orientation film through a rubbing method.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode transflective liquid crystal display device, comprising:
   first and second substrates facing and spaced apart from each other;
   a gate line and a data line on an inner surface of the first substrate, the gate line and the data line crossing each other to define a pixel region having a transmissive area and a reflective area;
   a common line parallel to the gate line;
   a thin film transistor connected to the gate line and the data line;
   a first passivation layer over the thin film transistor;
   a reflecting layer over the first passivation layer in the reflective area;
   a second passivation layer over the reflecting layer;
   a pixel electrode over the second passivation layer, the pixel electrode having a plate shape in the pixel region and connected to the thin film transistor;
   a third passivation layer over the pixel electrode;
   a common electrode over the third passivation layer, the common electrode connected to the common line, the common electrode including a plurality of first openings along a first direction in the transmissive area and a plurality of second openings along a second direction different from the first direction in the reflective area, each of the plurality of first openings and the plurality of second openings having a bar shape;
   a color filter layer on an inner surface of the second substrate; and
   a liquid crystal layer between the first and second substrate.

2. The device according to claim 1, further comprising:
   a first orientation film over the common electrode;
   a second orientation film over the color filter layer;
   a first polarizing plate on an outer surface of the first substrate; and
   a second polarizing plate on an outer surface of the second substrate.

3. The device according to claim 2, wherein each of orientation directions of the first and second orientation films in the transmissive area, a second polarization axis of the second polarizing plate and the orientation direction of the second orientation film in the reflective area has a first angle with respect to the first direction.

4. The device according to claim 3, wherein the orientation direction of the first orientation film in the reflective area is parallel to the second direction and has a second angle with respect to the second polarization axis, and wherein a first polarization axis of the first polarizing plate is perpendicular to the second polarization axis.

5. The device according to claim 4, wherein the first angle is within a range of about 5° to about 10°, and the second angle is within a range of about 62° to about 64°.

6. The device according to claim 2, wherein the first orientation film is oriented through an ultraviolet orientation method and the second orientation film is oriented through one of the ultraviolet orientation method and a rubbing method.

7. The device according to claim 1, wherein the liquid crystal layer has a first thickness in the transflective area and a second thickness in the reflective area, and a ratio of the second thickness to the first thickness is about 1/1.7.

8. The device according to claim 7, wherein the first thickness is within a range of about 3.8 μm to about 4.3 μm.

9. The device according to claim 1, further comprising:
   a first common protrusion extending from the common line, the first common protrusion disposed in the reflective area and overlapping a drain electrode of the thin film transistor to constitute a storage capacitor; and
   a second common protrusion extending from the common line, the second common protrusion overlapping the data line and the pixel electrode.

10. The device according to claim 1, wherein the common electrode is formed in one of the pixel region and an entire display region of the first substrate.

11. The device according to claim 1, wherein the first passivation layer includes an organic insulating material and has a plurality of first uneven portions at a top surface thereof in the reflective area, and the reflecting layer has a plurality of second uneven portions at a top surface thereof.

12. The device according to claim 11, further comprising:
   a fourth passivation layer of an inorganic insulating material between the thin film transistor and the first passivation layer;
   a fifth passivation layer of the inorganic insulating material between the first passivation layer and the reflecting layer; and
   a sixth passivation layer of the organic insulating material between the second passivation layer and the third passivation layer in the reflective area.

13. The device according to claim 1, further comprising:
   a black matrix between the second substrate and the color filter layer, the black matrix corresponding to the gate line and the data line; and
   an overcoat layer on the color filter layer.

14. The device according to claim 13, wherein the color filter layer has a through hole at a central portion of the reflective area.

15. A method of fabricating an in-plane switching mode transflective liquid crystal display device, comprising:
   forming a gate line and a data line on an inner surface of a first substrate, the gate line and the data line crossing each other to define a pixel region having a transmissive area and a reflective area;
   forming a common line parallel to the gate line;

forming a thin film transistor connected to the gate line and the data line;

forming a first passivation layer over the thin film transistor;

forming a reflecting layer over the first passivation layer in the reflective area;

forming a second passivation layer over the reflecting layer;

forming a pixel electrode over the second passivation layer, the pixel electrode having a plate shape in the pixel region and connected to the thin film transistor;

forming a third passivation layer over the pixel electrode;

forming a common electrode over the third passivation layer, the common electrode connected to the common line, the common electrode including a plurality of first openings along a first direction in the transmissive area and a plurality of second openings along a second direction different from the first direction in the reflective area, each of the plurality of first openings and the plurality of second openings having a bar shape;

forming a color filter layer on an inner surface of a second substrate;

attaching the first and second substrates such that the common electrode faces the color filter layer; and forming a liquid crystal layer between the first and second substrate.

16. The method according to claim 15, further comprising:
forming a first orientation film over the common electrode;
forming a second orientation film over the color filter layer;
forming a first polarizing plate on an outer surface of the first substrate, the first polarizing plate having a first polarization axis; and
forming a second polarizing plate on an outer surface of the second substrate, the second polarizing plate having a second polarization axis perpendicular to the first polarization axis.

17. The method according to claim 16, further comprising:
orienting the first orientation film, wherein an orientation direction of the first orientation film in the transmissive area is parallel to the second polarization axis and has a first angle with respect to the first direction, and wherein the orientation direction of the first orientation film in the reflective area is parallel to the second direction and has a second angle with respect to the second polarization axis; and
orienting the second orientation film, wherein the orientation direction of the second orientation film in the transmissive and reflective areas is parallel to the second polarization axis and have the first angle with respect to the first direction.

18. The method according to claim 17, wherein the first angle is within a range of about 5° to about 10°, and the second angle is within a range of about 62° to about 64°.

19. The method according to claim 16, wherein the first orientation film is oriented through an ultraviolet orientation method and the second orientation film is oriented through one of the ultraviolet orientation method and a rubbing method.

* * * * *